US012122630B2

(12) United States Patent
Mizuhara et al.

(10) Patent No.: US 12,122,630 B2
(45) Date of Patent: Oct. 22, 2024

(54) ADHESIVE BODY DELIVERY DEVICE AND ADHESIVE BODY DELIVERY METHOD

(71) Applicant: NITTO DENKO CORPORATION, Ibaraki (JP)

(72) Inventors: Ginji Mizuhara, Ibaraki (JP); Atsushi Takashima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 588 days.

(21) Appl. No.: 17/418,918

(22) PCT Filed: Dec. 23, 2019

(86) PCT No.: PCT/JP2019/050368
§ 371 (c)(1),
(2) Date: Jun. 28, 2021

(87) PCT Pub. No.: WO2020/137977
PCT Pub. Date: Jul. 2, 2020

(65) Prior Publication Data
US 2022/0119217 A1    Apr. 21, 2022

(30) Foreign Application Priority Data
Dec. 28, 2018   (JP) ................. 2018-247647

(51) Int. Cl.
*B29C 65/00*     (2006.01)
*B65H 37/02*     (2006.01)
*B65H 57/28*     (2006.01)

(52) U.S. Cl.
CPC ............ *B65H 37/02* (2013.01); *B65H 57/28* (2013.01); *B29C 66/4722* (2013.01); *B29C 66/8616* (2013.01); *B65H 2701/377* (2013.01)

(58) Field of Classification Search
CPC ............ B29C 65/5035; B29C 66/4722; B29C 66/8616; B65H 37/02; B65H 57/28
See application file for complete search history.

(56) References Cited

U.S. PATENT DOCUMENTS

| 3,813,275 A | 5/1974 | Weick et al. |
| 5,462,633 A | 10/1995 | Manusch et al. |

(Continued)

FOREIGN PATENT DOCUMENTS

| CH | 537 864 A | 6/1973 |
| CN | 101486284 A | 7/2009 |

(Continued)

OTHER PUBLICATIONS

International Search Report issued for corresponding International Patent Application No. PCT/JP2019/050368 on Mar. 10, 2020, along with an English translation.

(Continued)

*Primary Examiner* — Philip C Tucker
*Assistant Examiner* — Nickolas R Harm
(74) *Attorney, Agent, or Firm* — Hauptman Ham, LLP (57) ABSTRACT

An adhesive body delivery device includes a main body, a turning portion, and a press-bonding portion; the turning portion is mounted to the main body to be relatively turnable around a first turning axis A1; the press-bonding portion is mounted to the turning portion at a predetermined mounting position, and is turnable in conjunction with the turning portion; the press-bonding portion is configured to deliver an adhesive body at a predetermined delivery position P, and is configured to stick the adhesive body to a target object while press-bonding the adhesive body; a predetermined distance D is ensured between the first turning axis A1 of the turning portion and the mounting position; and the press-bonding portion is configured to turn around a second turning axis A2

(Continued)

passing through the mounting position and being parallel to the first turning axis A1.

12 Claims, 7 Drawing Sheets

(56) References Cited

U.S. PATENT DOCUMENTS

| | | | | |
|---|---|---|---|---|
| 9,108,457 | B2* | 8/2015 | Ohashi | B65H 37/007 |
| 2009/0050275 | A1* | 2/2009 | Sakanishi | B43L 19/0068 |
| | | | | 156/538 |
| 2009/0185849 | A1 | 7/2009 | Narita | |
| 2010/0084095 | A1* | 4/2010 | Sekiya | B65H 37/007 |
| | | | | 156/391 |
| 2012/0055635 | A1 | 3/2012 | Inokuchi et al. | |
| 2012/0267047 | A1* | 10/2012 | Maus | B65H 37/002 |
| | | | | 156/538 |
| 2015/0321869 | A1 | 11/2015 | Kai et al. | |

FOREIGN PATENT DOCUMENTS

| | | |
|---|---|---|
| CN | 102414103 A | 4/2012 |
| CN | 104822536 A | 8/2015 |
| CN | 107074006 A | 8/2017 |
| EP | 2 426 075 A1 | 3/2012 |
| JP | S60-44463 A | 3/1985 |
| JP | H3-119083 A | 5/1991 |
| JP | H9-315665 A | 12/1997 |
| JP | 2000-229766 A | 8/2000 |
| JP | 2001-97636 A | 4/2001 |
| JP | 4035103 B2 | 1/2008 |
| JP | 2009-143065 A | 7/2009 |
| JP | 4360815 B2 | 11/2009 |
| JP | 2014-74173 A | 4/2014 |
| JP | 6075038 B2 | 2/2017 |

OTHER PUBLICATIONS

Written Opinion issued for corresponding International Patent Application No. PCT/JP2019/050368 on Mar. 10, 2020.
Office Action issued on Nov. 18, 2022 for corresponding Chinese Patent Application No. 201980086560.4, along with an English machine translation (17 pages).
Office Action issued on Nov. 17, 2022 for corresponding Taiwanese Patent Application No. 108148036, along with an English translation (16 pages).
Office Action issued on Sep. 6, 2022 for corresponding Japanese Patent Application No. 2018-247647, along with an English machine translation (7 pages).
The Extended European Search Report issued on Sep. 9, 2022 for corresponding European Patent Application No. 19903748.2 (8 pages).
Office Action issued on May 22, 2024 for corresponding Korean Patent Application No. 10-2021-7019948, along with an English machine translation (7 pages).

* cited by examiner

ADHESIVE BODY DELIVERY DEVICE AND ADHESIVE BODY DELIVERY METHOD

CROSS REFERENCE TO RELATED APPLICATION

This application is a National Stage of International Application No. PCT/JP2019/050368, filed on Dec. 23, 2019, which designates the United States and was published in Japan, and which is based upon and claims priority to Japanese Patent Application No. 2018-247647, filed on Dec. 28, 2018 in the Japan Patent Office. All of the aforementioned applications are hereby incorporated by reference in their entireties.

TECHNICAL FIELD

The present invention relates to an adhesive body delivery device for delivering an adhesive body.

BACKGROUND ART

An adhesive body such as an adhesive sheet and an adhesive tape is used for bonding for various adherends such as metal, glass, wood, paper, cardboard, and plastic material. For example, when the adhesive body is in a wound form such as a roll-shaped adhesive tape, a base material in which a rear surface to be in contact with an adhesive surface is subjected to debonding treatment is used in order to facilitate rewinding.

Patent Literature 1 discloses a sticking jig for sticking an adhesive tape on an adherend that is long and has a bent portion in an intermediate portion of the adherend. The sticking jig is made us so that a first jig guide and a second jig guide are supported by a support member. The first jig guide moves the sticking jig along the adherend. The second jig guide is provided at a side opposite to the first jig guide so that a tape sticking head, which allows the adhesive tape to press-bond to the adherend, and the adherend are interposed between the first jig guide and the second jig guide and so that a distance from the adherend to the second jig guide can be changed. The second jig guide can control a posture of the sticking jig in accordance with a change in a shape of the adherend.

Patent Literature 2 discloses a transfer tool including a gripping member, a rotation body, and a transfer head. The gripping member can be gripped with an axis of the gripping member standing upright relative to a transfer target surface or inclined in a transfer advancing direction. The rotation body is held by the gripping member and can be rotated around the axis. The transfer head is held by the rotation body in a state in which a transfer end is inclined in an anti-transfer direction against the axis.

CITATION LIST

Patent Literature

Patent Literature 1: JP-A-2001-097636
Patent Literature 2: Japanese Patent No. 6075038

SUMMARY OF INVENTION

Technical Problem

In the sticking jig disclosed in Patent Literature 1, the adhesive tape can follow a movement along a gently curved line, but it is difficult for the adhesive tape to follow a movement along a narrow and sharped curved line. The transfer tool disclosed in Patent Literature 2 is based on the premise that a transfer tape in which a transfer material is placed on a so-called base material is supplied to a transfer head, and it is kept in mind that the transfer tool is pressed directly with a hand. For the transfer tool, a material that is easily bent and is difficult to follow a movement of a device, such as a yarn-like adhesive is not taken into consideration.

An object of the present invention is to provide an adhesive body delivery device and an adhesive body delivery method that can freely deliver an adhesive body and can stick the adhesive body.

Solution to Problem

An adhesive body delivery device according to the present invention comprises a main body a turning portion mounted to the main body to be relatively turnable around a first turning axis, and a press-bonding portion mounted to the turning portion at a mounting position and turnable in conjunction with the turning portion, the press-bonding portion being configured to deliver an adhesive body at a delivery position and being configured to stick the adhesive body to a target object while press-bonding the adhesive body, in which a predetermined distance is ensured between the first turning axis of the turning portion and the mounting position, and in which the press-bonding portion is configured to turn around a second turning axis passing through the mounting position and being parallel to the first turning axis.

In the adhesive body delivery device according to the present invention, for example, the adhesive body passes through a space defined inside the main body and is supplied to the press-bonding portion.

In the adhesive body delivery device according to the present invention, for example, the turning portion is provided with a guide member configured to guide the adhesive body.

In the adhesive body delivery device according to the present invention, for example, the adhesive body is supplied to the guide member from a position outside the main body.

In the adhesive body delivery device according to the present invention, for example, the press-bonding portion is a roller that is rotatable independently of the turning portion around a rotation axis coinciding with the mounting position,
  wherein the adhesive body passes through an outer periphery of the roller and is delivered along with a rotation of the roller, and
  wherein the predetermined distance is ensured between the rotation axis and the first turning axis.

In the adhesive body delivery device according to the present invention, for example, the adhesive body includes an adhesive layer and a separator covering at least a part of the adhesive layer, and
  wherein at the press-bonding portion, the separator is debonded from the adhesive layer and the adhesive body is stuck to the target object.

In the adhesive body delivery device according to the present invention, for example, the adhesive body is a yarn-like adhesive body.

In the adhesive body delivery device according to the present invention, for example, the adhesive body is a pressure-sensitive adhesive body.

An adhesive body delivery method includes sticking an adhesive body to a target object using an adhesive body delivery device, the adhesive body delivery device including, a main body, a turning portion mounted to the main body to be relatively turnable around a first turning axis and a press-bonding portion mounted to the turning portion at a mounting position and turnable in conjunction with the turning portion, the press-bonding portion being configured to deliver an adhesive body at a delivery position and being configured to stick the adhesive body to a target object while press-bonding the adhesive body, in which a predetermined distance is ensured between the first turning axis of the turning portion and the mounting position, in which the press-bonding portion is configured to turn around a second turning axis passing through the mounting position and being parallel to the first turning axis Advantageous Effects of Invention The present invention allows for freely delivering and sticking the adhesive body to a target object, since a predetermined distance is ensured between the turning axis of the turning portion that is turnable relative to the main body and the mounting position of the press-bonding portion.

DESCRIPTION OF EMBODIMENTS

Hereinafter, an adhesive body delivery device according to preferred embodiments of the present invention will be described in detail with reference to FIGS. 1 to 7.

Figure 1:
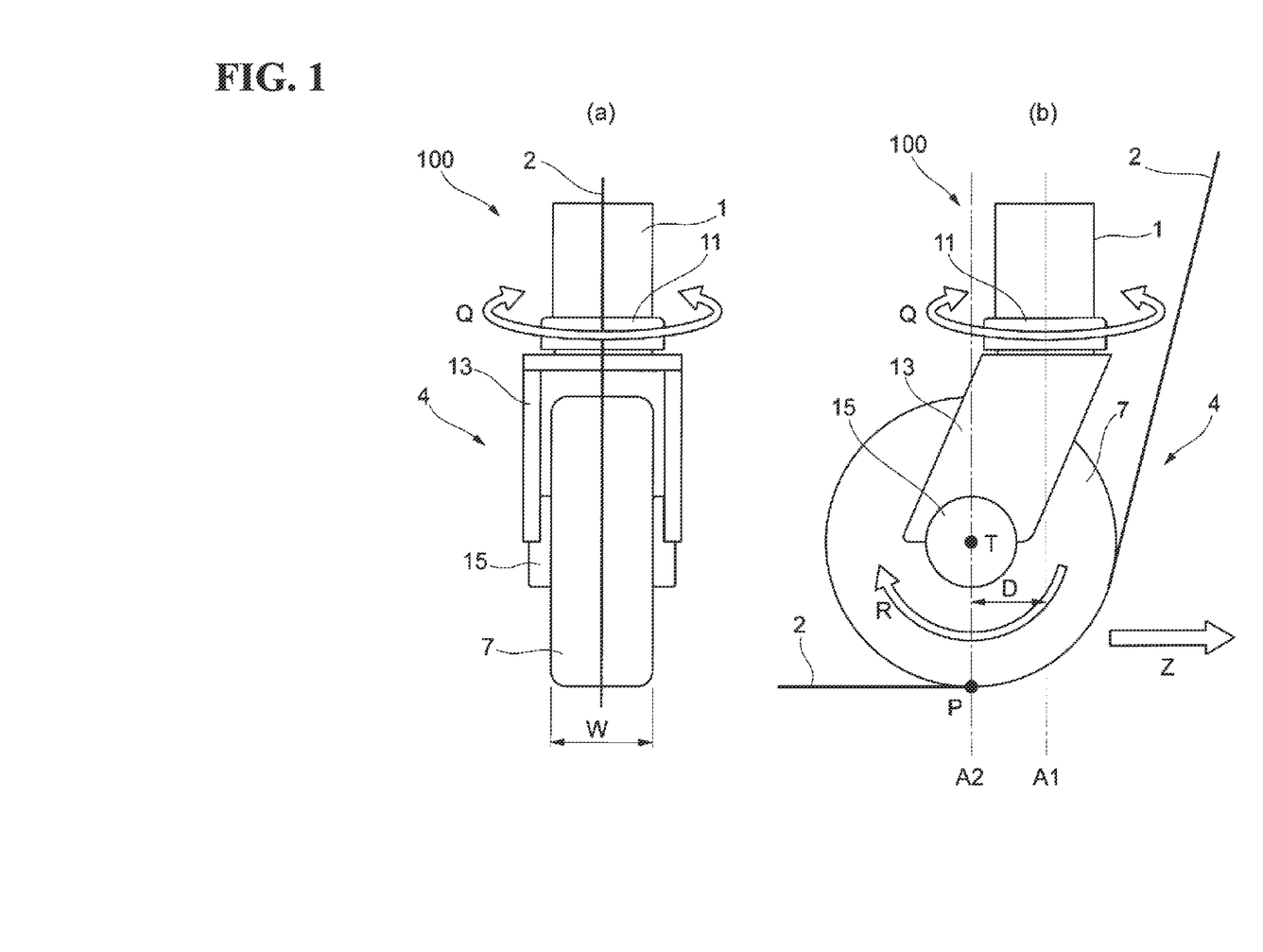
FIG. 1 is a view illustrating the main part of an adhesive body delivery device according to a first embodiment, (a) of FIG. 1 is a front view, and (b) of FIG. 1 is a side view.

FIG. 1 is a view illustrating the main part of an adhesive body delivery device 100 according to a first embodiment, (a) is a front view, and (b) is a side view. As shown in FIG. 1, the adhesive body delivery device 100 includes a main body 1 having a shaft shape, and an end portion 4 that is mounted to a first end of the main body 1 so that the end portion is rotatable. FIG. 1 only shows the vicinity of a portion of the main body 1 that is connected to the end portion 4.

The adhesive body delivery device 100 according to the present example is estimated to be a relatively large device, and a supply source (an adhesive article winder such as a bobbin) of the yarn-like adhesive body 2 installed in another place delivers the adhesive body 2 and supplies the adhesive body 2 to the adhesive body delivery device 100. The adhesive body delivery device 100 to which the adhesive body 2 has been supplied presses the end portion 4 of the adhesive body delivery device 100 against a target object that is an adherend of the adhesive body, and moves in an arrow Z direction, so that the adhesive body 2 can be delivered and can be stuck to a target object. Setting an operation and a trajectory in advance by programming or the like enables the main body 1 of the adhesive body delivery device 100 to move along the set trajectory, and the adhesive body 2 delivered from the end portion 4 can be stuck to the target object. The adhesive body 2 is not limited as long as the adhesive body 2 is an elongated adhesive body. The adhesive body 2 has a linear shape in the present embodiment. Details of the adhesive body 2 will be described later.

The main body 1 has a shaft shape extending in one axial direction. At a first end (tip end) of the main body 1, the end portion 4 is rotatably (turnably) mounted to the main body 1. The end portion 4 includes a turning portion 11 mounted to the main body 1 to be relatively rotatable (turnable), a support portion (fork) 13 that is bifurcated and has a U-shaped cross section, and a roller (press-bonding portion) 7 mounted to the support portion 13 with a rotation shaft 15 provided at an end of the support portion 13 so that the roller 7 can be rotated to the support portion 13 in an arrow direction R (and an opposite direction to the arrow direction R). The main body 1 has a main function of moving the end portion 4 while supporting the end portion 4, in particular, the turning portion 11 of the end portion 4 so that the turning portion 11 is rotatable. The roller 7 is a roller capable of rotating around the rotation shaft 15 independently of the turning portion 11. The press-bonding portion that delivers the adhesive body 2 is constituted by the roller 7 in the present embodiment, but a shape of the press-bonding portion is not limited, and the press-bonding portion may be constituted by a brush or the like. A groove may be formed on a surface of the roller 7.

The turning portion 11 can be rotated in an arrow direction Q independently of the main body 1 at the first end of the main body 1. The support portion 13 is integrally mounted to the turning portion 11. When the turning portion 11 is turned in the arrow direction Q, the support portion 13 is also turned in conjunction with the turning portion 11. Therefore, when the main body 1 moves in a Z direction, the roller 7 is rotated in the arrow direction R and delivers the adhesive body 2. The adhesive body 2 passes through an outer periphery of the roller 7 along with a rotation of the roller 7 and is delivered. The roller 7 functions as a press-bonding portion that delivers the adhesive body 2 coming from the outside without being restricted by the adhesive body delivery device 100 to a predetermined delivery position P where the adhesive body 2 comes into contact with a target object, and that directly press-bonds and sticks the adhesive body 2 to the target object. A width W of the roller 7 is set to, for example, 2 to 3 times a radius of the main body 1 of the adhesive body delivery device 100, but is not limited.

A shape, a mechanism, and the like of the turning portion 11 are not limited as long as the turning portion 11 has a rotating function. The turning portion 11 may use a bearing system such as a caster, and may use two members capable of rotating relative to each other and are fitted to each other. The turning portion 11 and the roller 7 (press-bonding portion) are not necessarily adjacent to each other as long as the turning portion 11 and the roller 7 (press-bonding portion) have an offset relationship (see an embodiment in FIG. 6 to be described later).

An axis that is a central axis of the turning of the turning portion 11 and is parallel to an axis of the main body 1 in the longitudinal direction in the present embodiment is defined as a first turning axis A1, and an axis that passes through the center of the roller 7, that is, a mounting position T to the turning portion 11 (coincides with the rotation shaft 15 of the roller 7 in the present embodiment) and that is parallel to the first turning axis A1 is defined as a second turning axis A2. That is, the turning portion 11 is mounted to the main body 1 so that the turning portion 11 can be relatively turned around the first turning axis A1. The roller 7, which is a press-bonding portion, is mounted to the turning portion 11 at the predetermined mounting position T, and can be turned in conjunction with the turning portion 11.

In this case, a predetermined distance (offset) D is ensured between the first turning axis A1 and the mounting position T. The predetermined distance D is also ensured between the first turning axis A1 and the second turning axis A2, and the predetermined distance D is also ensured between the rotation shaft 15 and the first turning axis A1. That is, the roller 7 is turned around the second turning axis A2 passing through the mounting position T and being parallel to the first turning axis A1.

Such a configuration allows the turning portion 11 and the roller 7 to be turned in conjunction with each other in a state in which the turning axes of the turning portion 11 and the roller 7 are separated from each other in a predetermined distance D. Turning performance of the end portion 4 is improved by increasing the predetermined distance D and straight ahead stability of the end portion 4 is improved by reducing the predetermined distance D, and thus the predetermined distance D can be appropriately set in consideration of performance required for the adhesive body delivery device 100.

Figure 2:
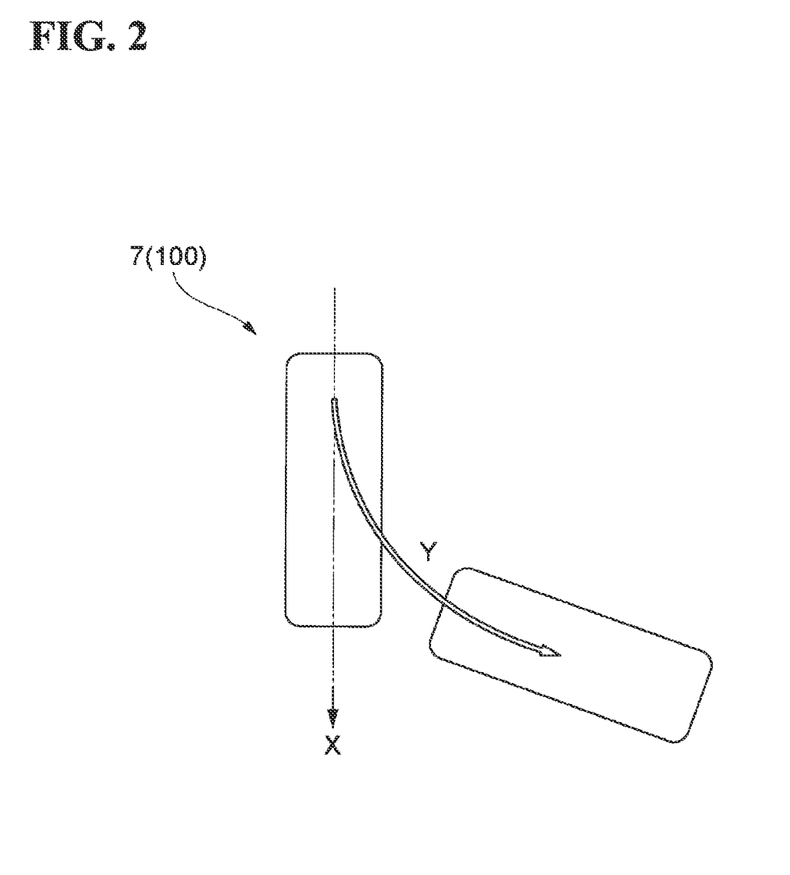
FIG. 2 is a conceptual diagram illustrating a mode in which a roller of the adhesive body delivery device moves.

FIG. 2 is a conceptual diagram illustrating a mode in which the adhesive body delivery device 100 moves, particularly the roller 7 of the adhesive body delivery device 100 moves. When the adhesive body delivery device 100 moves straight as indicated by an arrow X or moves in accordance with the straight movement, the adhesive body 2 is delivered as expected while being prevented from coming off the roller 7 that is the press-bonding portion, and is stuck to a target object.

When the adhesive body delivery device 100 moves along a curved line as indicated by an arrow Y, the turning portion 11 turns in the arrow direction Q around the first turning axis A1 independently of the main body 1, and the roller 7, which is the press-bonding portion, also turns in the arrow direction Q around the second turning axis A2 in conjunction with the turning portion 11. As a result, the adhesive body 2 is stuck along the curved line while being press-bonded by the roller 7.

However, when the curved line indicated by the arrow Y has a very large curvature (of a sharp angle), the adhesive body 2 that is independent of the adhesive body delivery device 100 cannot follow the movement of the roller 7, and the adhesive body 2 may greatly deviate within a range of the width W of the roller 7 or may come off from the roller 7. When such a situation occurs, it is difficult to smoothly deliver the adhesive body 2 so that the adhesive body 2 follows the curved line. Thus, even when the adhesive body delivery device 100 moves as indicated by the arrow Y, it is required that the adhesive body 2 follows the adhesive body delivery device 100 and is smoothly delivered from the roller 7 while being prevented from coming off from the roller 7. In particular, when the adhesive body delivery device 100 is mounted to an end of a large apparatus, it is difficult to directly control the movement of the adhesive body 2 by pressing the adhesive body delivery device 100 or the like. Therefore, the importance of such a requirement is increased.

Figure 3:
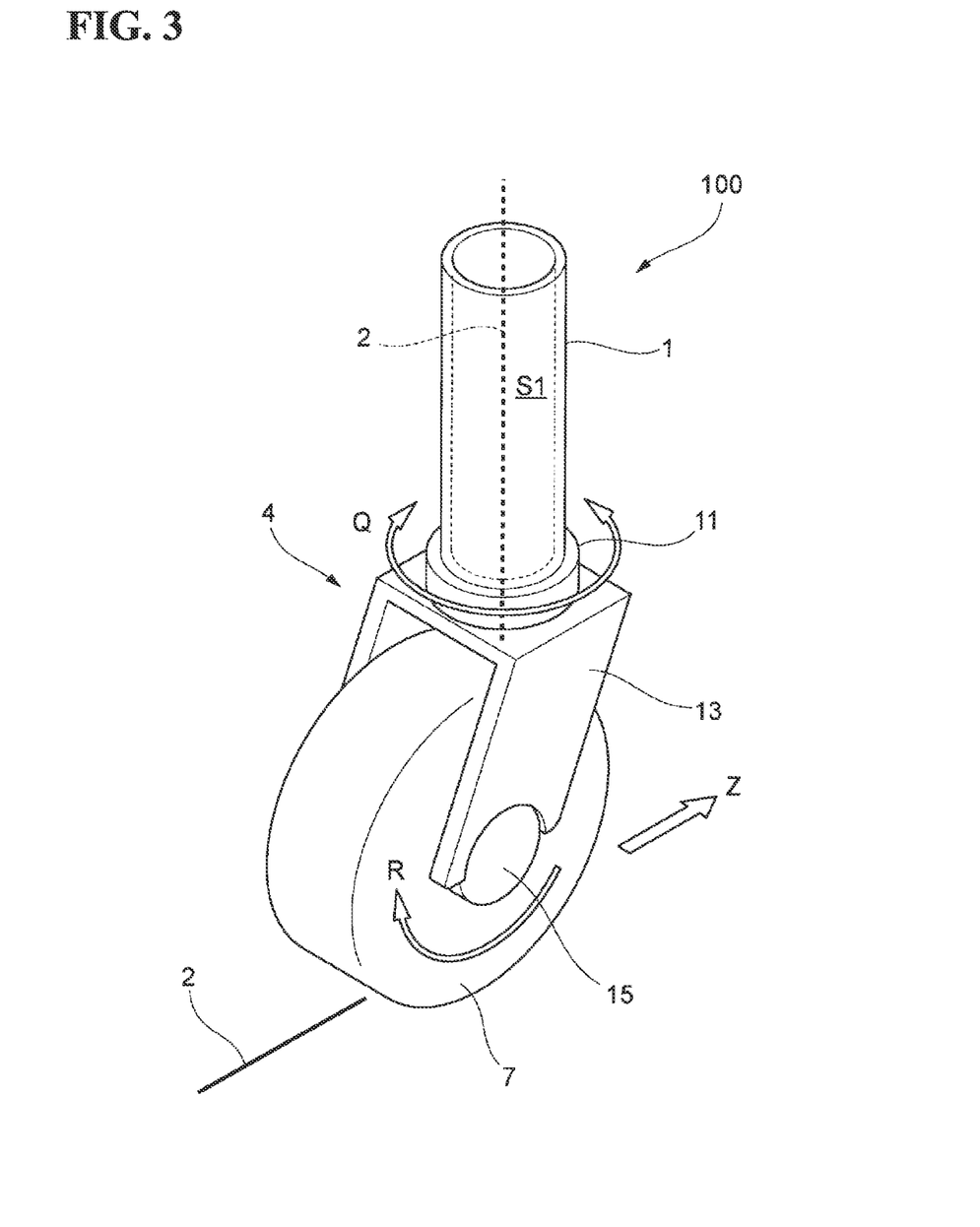
FIG. 3 is a perspective view illustrating the main part of an adhesive body delivery device according to a second embodiment.

FIG. 3 is a perspective view illustrating the main part of the adhesive body delivery device 100 according to a second embodiment. In the present embodiment, the adhesive body 2 passes through an internal space S1 defined inside the main body 1, arrives at the end portion 4, is supplied to the roller 7, and then is delivered. A movable range of the adhesive body 2 is restricted by the internal space S1, at least a part of the adhesive body 2 in the internal space S1 moves following the movement of the main body 1. That is, the adhesive body 2 can easily follow the movement of the main body 1, that is, the movement of the adhesive body delivery device 100. Such an embodiment allows for preventing a situation in which the adhesive body 2 comes off from the roller 7, even when the adhesive body delivery device 100 moves as indicated by the arrow Y in FIG. 2.

Figure 4:
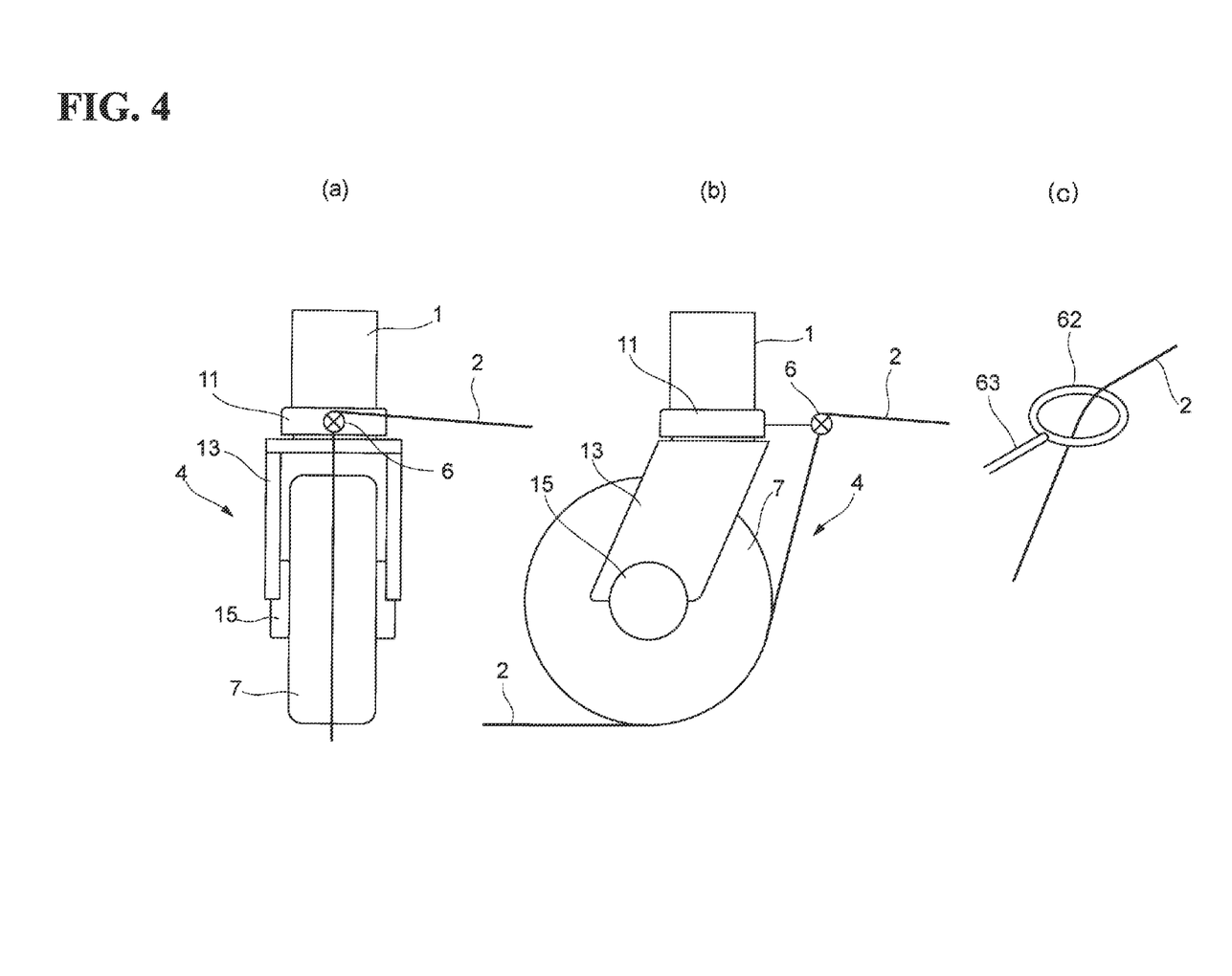
FIG. 4 is a view illustrating the main part of an adhesive body delivery device according to a third embodiment, (a) of FIG. 4 is a front view, (b) of FIG. 4 is a side view, and (c) of FIG. 4 is a view illustrating a guide ring that is a specific example of a guide member.

FIG. 4 is a view illustrating the main part of the adhesive body delivery device 100 according to a third embodiment, (a) is a front view, and (b) is a side view. In the present embodiment, a guide member 6 capable of guiding the adhesive body 2 to a delivery position of the roller 7 following the movement of the turning of the turning portion 11 is provided at an outer side of the turning portion 11. The guide member 6 is mounted to the turning portion 11, and thus the adhesive body 2 passing through the guide member 6 can easily follow the movement of the turning portion 11. This allows for preventing a situation in which the adhesive body 2 comes off from the roller 7 even when the adhesive body delivery device 100 moves as indicated by the arrow Y in FIG. 2. Providing the guide member 6 at a position lower than the turning portion 11 allows the adhesive body 2 to more easily follow the movement of the turning portion 11. (c) of FIG. 4 illustrates a guide ring 62 that is a specific example of the guide member 6, and the guide ring 62 is fixed to the turning portion 11 by a rod-shaped support member 63.

Figure 5:
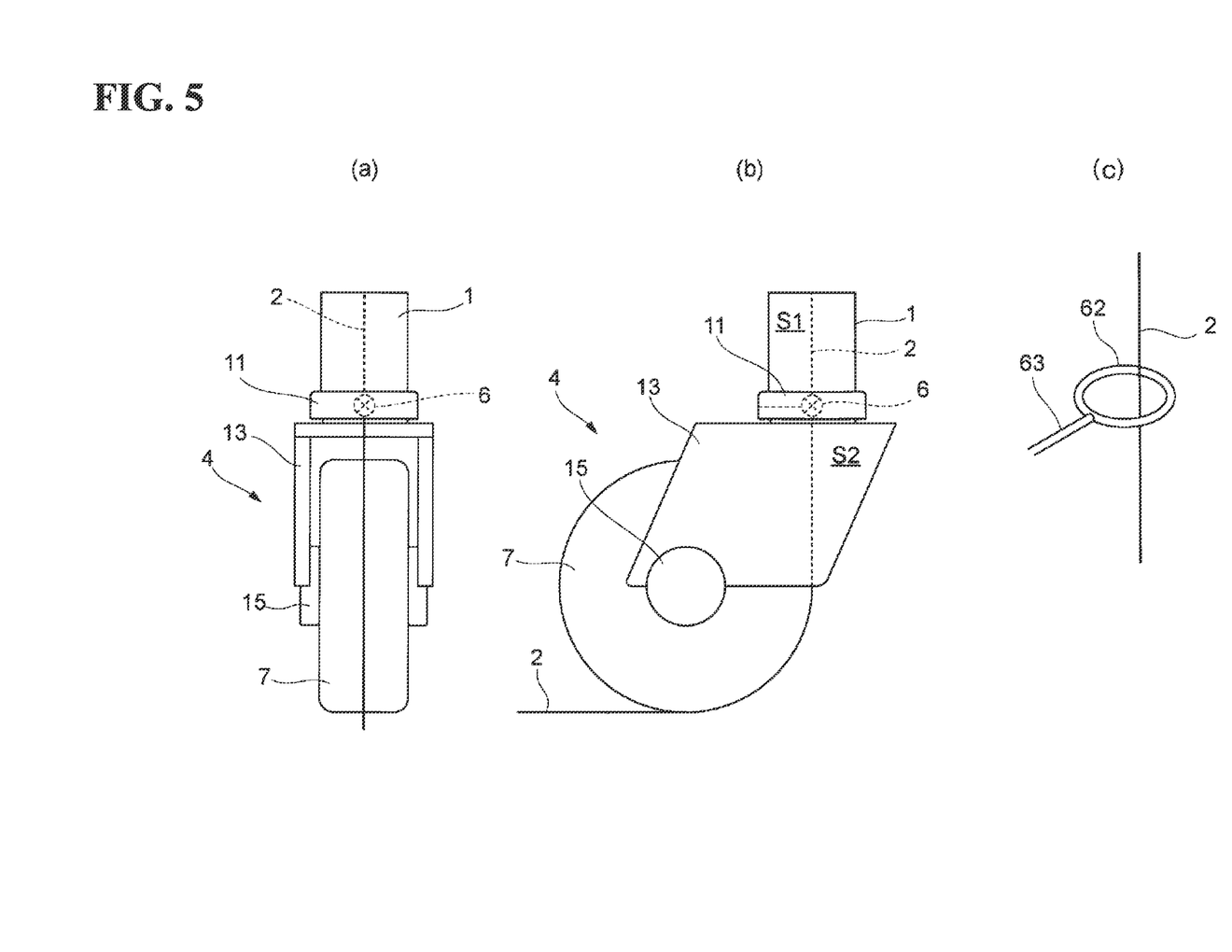
FIG. 5 is a view illustrating the main part of an adhesive body delivery device according to a fourth embodiment, (a) of FIG. 5 is a front view, (b) of FIG. 5 is a side view, and (c) of FIG. 5 is a view illustrating a guide ring that is a specific example of a guide member.

FIG. 5 is a view illustrating the main part of the adhesive body delivery device 100 according to a fourth embodiment, (a) is a front view, and (b) is a side view. Similar to the second embodiment, the adhesive body 2 passes through the internal space S1 of the main body 1, arrives at the end portion 4, linearly extends to pass through an internal space S2 of the end portion 4, and then is delivered while being press-bonded by the roller 7 in the present embodiment. The guide member 6 capable of guiding the adhesive body 2 following the movement of the turning of the turning portion 11 is provided at an inner side of the turning portion 11. The guide member 6 is mounted to the turning portion 11, and thus the adhesive body 2 passing through the guide member 6 can easily follow the movement of the turning portion 11. This allows for preventing a situation in which the adhesive body 2 comes off from the roller 7 even when the adhesive body delivery device 100 moves as indicated by the arrow Y in FIG. 2. Providing the guide member 6 at a position lower than the turning portion 11 allows the adhesive body 2 to more easily follow the movement of the turning portion 11. (c) of FIG. 5 shows the guide ring 62, which is a specific example of the guide member 6, and the guide ring 62 is fixed to the turning portion 11 by the rod-shaped support member 63.

Similar to the second embodiment, a movable range of the adhesive body 2 is restricted by the internal space S1, and thus at least a part of the adhesive body 2 in the internal space S1 moves following the movement of the main body 1. That is, the adhesive body 2 can easily follow the movement of the main body 1, that is, the movement of the adhesive body delivery device 100, and thus the guide member 6 is not essential.

Figure 6:
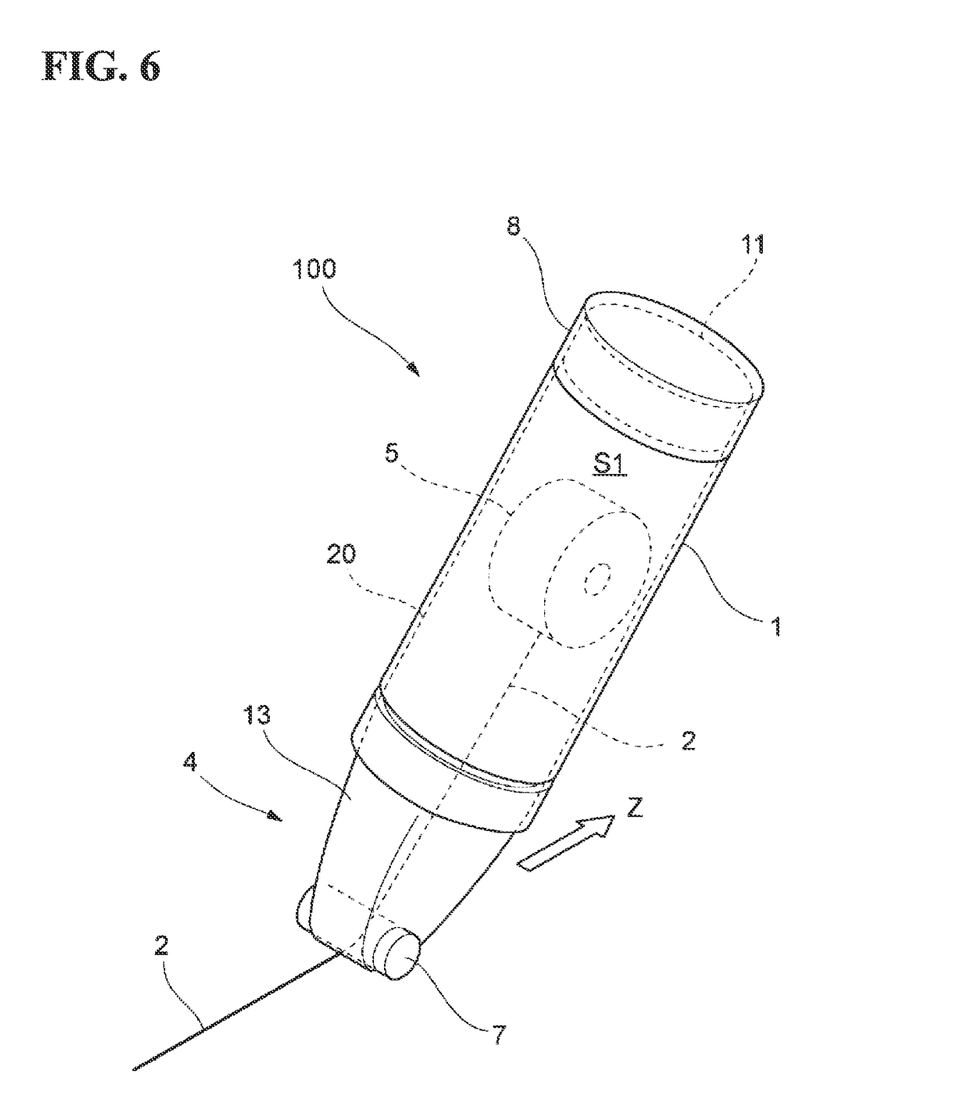
FIG. 6 is a side view illustrating an adhesive body delivery device according to a fifth embodiment in a usage state.

In the embodiments in FIGS. 1 to 5, it is assumed that the adhesive body 2 is supplied from any position outside the main body 1 to, for example, the guide member 6 provided at the turning portion 11, and that the adhesive body delivery device and a supply source of the adhesive body 2 are separately provided. On the other hand, in an adhesive body delivery device according to a fifth embodiment shown in FIG. 6, it is assumed that the adhesive body delivery device and the supply source of the adhesive body 2 are integrally provided. As shown in FIG. 6, the adhesive body delivery device 100 according to the present embodiment includes the main body 1 forming an outer case having a shaft shape, and an internal main body 20 partially housed in the shaft shaped internal space S1 that is defined inside the main body 1. A grip formed of resin or the like may be provided on an outer periphery of the main body 1.

A worker grips the adhesive body delivery device 100 at a grip portion or the like of the main body 1, presses the end portion 4 against a target object which is an adherend of the adhesive body 2, and moves the end portion 4 in the arrow Z direction, so that the adhesive body 2 can be delivered. That is, a worker can use the adhesive body delivery device 100 with a feeling of operating a writing instrument such as a pen or a feeling of operating an instrument such as a correction tape while gripping the elongated main body 1 having a shaft shape. For example, a worker can operate the adhesive body delivery device 100 as expected even in a narrow place with many obstacles or the like, and can efficiently perform various works.

The internal main body 20 is fixed in the internal space S1 of the main body 1. The end portion 4 of a first end (tip end) of the internal main body 20 includes the support portion 13 protruding from the internal space S1 and the roller 7 mounted to the support portion 13 so that the roller 7 is rotatable. The internal main body 20 further includes a winding body (bobbin) 5 housed in the internal space S1.

The turning portion 11 is provided at a second end (rear end) of the internal main body 20, and a cylindrical cap 8 is mounted to the second end of the internal main body 20. An engaging portion (a groove or the like) that engages with the turning portion 11 is provided, for example, inside the cap 8. The turning portion 11 is coupled to the support portion 13 (roller 7) and the winding body 5, and can turn relative to the main body 1. On the other hand, the cap 8 is mounted to the main body 1 in a state in which the cap 8 can be relatively rotated to the main body 1 at an outer side of the turning portion 11.

A worker grips the adhesive body delivery device 100, presses the end portion 4 against a target object, which is an adherend of the adhesive body 2, and moves the adhesive body delivery device 100 in the arrow Z direction, so that the adhesive body 2 is delivered. When the worker moves the adhesive body delivery device 100 along a curved line that has a large curvature (of a sharp angle) as indicated by the arrow Y in FIG. 2, the worker operates the main body 1 to move the adhesive body delivery device 100. Following this movement, the support portion 13 (roller 7), the winding body 5, the turning portion 11, and the cap 8 are turned independently of the main body 1. As a result, the adhesive body 2 is delivered from the roller 7 while being prevented from coming off from the roller 7. The roller 7 serving as a press-bonding portion and the turning portion 11 are not adjacent to each other in this embodiment.

Figure 7:
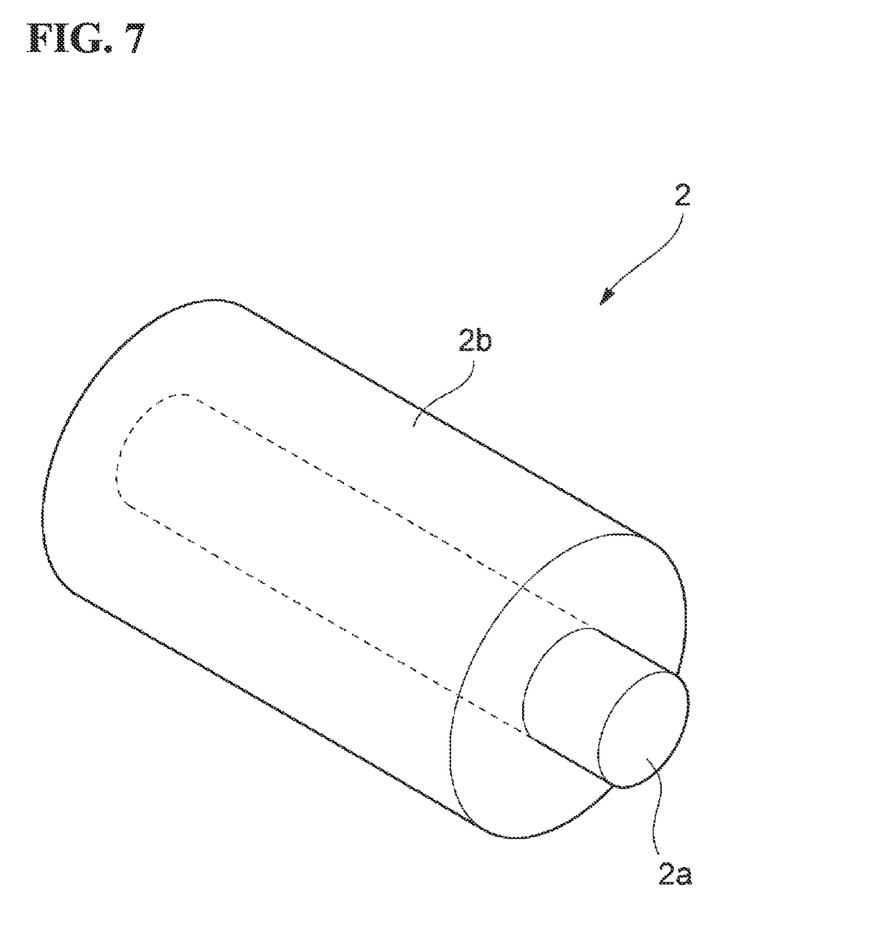
FIG. 7 is a schematic view illustrating an adhesive body to be used in an adhesive body delivery device.

FIG. 7 is a schematic view illustrating the adhesive body 2 used in the adhesive body delivery device 100 according to the present embodiment. The adhesive body 2 according to the present embodiment is a linear adhesive body that includes a linear core material 2a and an adhesive layer 2b covering a surface of the core material 2a in a longitudinal direction.

The adhesive body 2 is not limited as long as the adhesive body 2 is an elongated adhesive body. The adhesive body 2 has a linear shape in the present embodiment. The linear shape mentioned here is a concept including not only a straight line, a curved line, a polygonal line, and the like, but also a state in which the adhesive body 2 can be bent in various directions and angles like a yarn (hereinafter, also referred to as a yarn-like). The adhesive layer in the present specification also includes a linear adhesive layer.

Although a cross-sectional shape of the adhesive body in the example of the present configuration is a circular shape, the present embodiment is not limited thereto, and the cross-sectional shape may be an elliptical shape, a rectangular shape such as a quadrangular shape, or the like, in addition to the circular shape.

The adhesive layer 2b contains an adhesive formed of an adhesive composition. The adhesive is not limited as long as the adhesive satisfies the above mentioned gel fraction and an amount of a change in the gel fraction, and a known adhesive can be used. Examples of the adhesive include an acrylic adhesive, a rubber-based adhesive, a vinyl alkyl ether-based adhesive, a silicone-based adhesive, a polyester-based adhesive, a polyamide-based adhesive, a urethane-based adhesive, a fluorine-based adhesive, and an epoxy-based adhesive. Among these adhesives, from the viewpoint of adhesiveness, an acrylic adhesive, a urethane-based adhesive, a silicone-based adhesive, a rubber-based adhesive, or a polyester-based adhesive is preferable, and an acrylic adhesive is particularly preferable. These adhesives may be used alone or may be used in a combination of two or more adhesives. The adhesive in the present embodiment is preferably a pressure-sensitive adhesive that has adhesiveness at room temperature. The pressure-sensitive adhesive preferably can stick an adherend to a surface of the pressure sensitive adhesive by a pressure generated when the surface of the adhesive and the surface of the adherend are brought into contact with each other. The pressure-sensitive adhesive can be applied to a heat-sensitive adherend without a need for heating.

For the adhesive, both types of a solvent-type adhesive of a water-dispersible type adhesive can be used. The adhesive is preferably an adhesive in which a crosslinking proceeds by drying (solvent volatilization) and the crosslinking is quickly completed after drying. This is for avoiding increase in a number of new crosslinking after surfaces of adhesive layers come into contact with one another. Here, the adhesive is preferably a water-dispersible type adhesive, and more preferably a water-dispersible type acrylic adhesive from the viewpoints that the water-dispersible type adhesive can be high-speedily coated, is environmentally friendly, and that a solvent has a small influence on a base material or a core material (swelling or dissolution).

In the adhesive body having a core material, an adhesive layer may cover the entire surface of the core material (a surface in a longitudinal direction), or may cover at least a part of the surface of the core material. Although an adhesive layer is typically formed to be continuous, the adhesive layer is not limited to such a form, and may be formed in a regular pattern such as a dot pattern or a stripe pattern, or random pattern. An end surface of the core material may or may not be covered with an adhesive layer. For example, when the adhesive body is cut during a producing process or during use, the end surface of the core material may not be covered with an adhesive layer.

The core material used in the adhesive body may use, for example, a resin, a rubber, a foam, an inorganic fiber, a composite thereof, or the like. Examples of the resin include polyolefins such as polyethylene (PE), polypropylene (PP), an ethylene/propylene copolymer, and an ethylene/vinyl acetate copolymer; a polyester such as polyethylene terephthalate (PET); a vinyl chloride resin; a vinyl acetate resin; a polyimide resin; a polyamide resin; and a fluorine resin. Examples of the rubber include a natural rubber, and a synthetic rubber such as a urethane rubber. Examples of the foam include a polyurethane foam and a foamed polychloroprene rubber. Examples of the fiber include a glass fiber, a carbon fiber, a metal fiber, a chemical fibers (a regenerated fiber, a semi-synthetic fiber, a synthetic fiber, and the like), and a natural fiber (a plant fiber, an animal fiber, and the like). A cross-sectional shape of the core material is not limited, and is usually a cross-sectional shape corresponding to a cross-sectional shape of the adhesive body.

Examples of a material of the yarn-like core material that can be used in the yarn-like adhesive body include various polymer materials such as rayon, cupra, acetate, promix, nylon, aramid, vinylon, vinylidene, polyvinyl chloride, polyester, acrylic, polyethylene, polypropylene, polyurethane, polyclal, and polylactic acid; glass, carbon fiber, various rubbers such as natural rubber and synthetic rubber such as polyurethane; natural materials such as cotton and wool; and metal. A form of the yarn-like core material may be a monofilament, a multifilament, a spun yarn, a processed yarn, which has been subjected to crimping or bulking and called a textured yarn, a bulky yarn, and a stretch yarn, or combined yarns obtained by twisting them together, or the like. A cross-sectional shape of the core material is not limited to a circular shape, and can be a short shape such as a square shape or a star shape, an elliptical shape, a hollow shape, and the like.

The core material may contain various additives such as a filler (inorganic filler, organic filler, or the like), an age resister, an antioxidant, a UV absorber, an antistatic agent, a lubricant, a plasticizer, and a coloring agent (pigments, dyes or the like) as necessary. The known or common surface treatment such as corona discharge treatment, plasma treatment or application of an undercoat agent may be performed on the surface of the core material.

A size of a cross section of the core material is not limited but may be appropriately selected depending on a purpose. For example, when the cross-sectional shape of the core material is a circular shape, a diameter of the cross-sectional shape of the core material is preferably 1 µm to 2000 µm, and more preferably 10 µm to 1000 µm from the viewpoint of handleability (flexibility, difficulty in cutting).

A thickness of the adhesive layer is not limited, but is, for example, preferably 1 µm or more, and more preferably 3 µm or more from the viewpoint of adhesiveness. The thickness of the adhesive layer is, for example, preferably 200 µm or less, and more preferably 150 µm or less from the viewpoint of thickness unevenness and drying properties. Further, the thickness can be increased according to an application by stacking layers.

In particular, the adhesive body 2 in the present embodiment is preferably a pressure-sensitive adhesive body in which the adhesive forming the adhesive layer 2b has adhesiveness at room temperature and that can be stuck to a surface of an adherend by a pressure generated when a surface of the adhesive and the surface of the adherend are brought into contact with each other. The pressure-sensitive adhesive can be applied to a heat-sensitive adherend without a need for heating.

As described above, the shape of the adhesive body 2 is not limited. The larger ratio (major axis/minor axis) of a length of the major axis (the longest axis that passes through the center of gravity of the cross-section) to a length of the minor axis (the shortest axis that passes through the center of gravity of the cross-section) in the cross-sectional shape of the adhesive body 2 equates to the flatter shape of the adhesive body 2.

On the other hand, as the ratio becomes smaller, the cross-sectional shape of the adhesive body comes close to a circular shape. When the cross-sectional shape of the adhesive body is a circular shape, the ratio is 1, a minimum value. When the ratio is 1, a minimum value, the cross-sectional shape of the adhesive also includes a special shape such as a triangle and a star shape.

A typical example in which the adhesive body has a flat shape is an adhesive tape, and an adhesive layer is provided on one surface or two surfaces of the core material. The adhesive tape preferably includes a separator covering at least a part of the adhesive layer. When an adhesive body having a separator is used, the separator is debonded from the adhesive layer at the press-bonding portion 7, and the adhesive body is stuck to a target object. A correction tape similar to such an adhesive tape is used for the adhesive body 2 in the fifth embodiment shown in FIG. 6. In the adhesive body 2 delivered from the roller 7, only a base tape portion corresponding to the separator is wound around the winding body 5, and a correction material corresponding to the adhesive layer is stuck to a target object.

Embodiments and usage methods of the adhesive body are roughly classified into the following four patterns. Here, a non-adhesive layer is a layer that covers a surface (a surface in the longitudinal direction) of the adhesive body, and examples of the non-adhesive layer includes, for example, a layer that covers the adhesive body in an initial state before stretching and is cut out by stretching the adhesive body to exhibit adhesiveness of the adhesive body. However, a type, a material, and the like of the non-adhesive layer are not limited.

1) An adhesive body without a non-adhesive layer is directly press-bonded.
2) An adhesive body without a non-adhesive layer+a separator (the separator is debonded before the press-boding)
3) An adhesive body covered with a non-adhesive layer
4) An adhesive body covered with a non-adhesive layer+a separator (the separator is debonded before the press-bonding)

Further, the adhesive body according to the present embodiment preferably has flexibility, and particularly preferably has a yarn-like shape that can be bent in various directions and angles like a yarn. The adhesive body having flexibility, in particular, an adhesive body having a yarn-like shape, has an advantage in that the adhesive body can be easily applied to complicated shapes such as a curved line, a curved surface, and unevenness, in addition to the effects described above.

For example, when the adhesive tape is stuck to an adherend having a portion of a complicated shape such as a curved line, a curved surface, or unevenness, a wrinkle or overlapping may occur in the adhesive tape in such a portion, and it is difficult to finely stick the adhesive tape while preventing a protrusion. The portion where a wrinkle or overlapping occurs may cause a decrease in an adhesive force. For sticking the adhesive tape while preventing the occurrence of a wrinkle or overlapping, one option might be to stick the adhesive tape while finely cutting the adhesive tape, but workability significantly deteriorates. On the other hand, an adhesive body having flexibility, in particular, a yarn-like adhesive body, can be firmly stuck to a portion having a complicated shape such as a curved line, a curved surface, and unevenness without causing a wrinkle or overlapping. Further, such an adhesive body can be stuck to a portion to be stuck at one time, that is, in one step, and thus the adhesive body is excellent in workability and can also be applied to an automation line.

Specific examples of an application of the yarn-like adhesive body include an application to fix, in a desired form, a cable such as an electric wire or an optical fiber, an optical fiber sensor such as an LED fiber light and a fiber Bragg gratings (FBG), various wire members (linear members) such as a yarn, a string, and a wire, and a narrow member. For example, even when a wire member or a narrow member is fixed in a complicated shape, to another member, the yarn-like adhesive body can firmly fix the wire member or the narrow member in accordance with the complicated shape which the wire member or the narrow member has, with excellent workability while preventing a protrusion, a wrinkle, and overlapping. When a wire member or a narrow member is fixed to another member, the yarn-like adhesive body can be stuck in advance in accordance with a form in which the wire member or the narrow member is to be fixed on a surface of the another member, and then the wire member or the narrow member may be stuck and fixed in accordance with the adhesive body stuck to the surface of the another member. Alternatively, the yarn-like adhesive body may be stuck to the wire member or the narrow member, and thereafter the wire member or the narrow member may be fixed to another member in a desired form.

The yarn-like adhesive body can also be suitably used for temporary fixing of an article for temporarily fixing one article to a surface of another article. More specifically, the yarn-like adhesive body is particularly suitably used for temporary fixing when textile products, leather products, and the like, such as clothes, shoes, bags, and hats are manufactured. An application of the yarn-like adhesive body is not limited to thereto, and the yarn-like adhesive body is suitably used for various applications in which temporary fixing is desired.

For example, when one article is fixed to a surface of another article, the one article is positioned on the surface of the other article by temporarily fixing in advance using the yarn-like adhesive body, and then both articles are fixed (finally fixed) by a fixing method such as thermocompression or sewing. In this case, the yarn-like adhesive body allows for facilitating the temporary fixing while avoiding a fixing position provided between the both articles. For example, performing the temporary fixing using the yarn-like adhesive body for sewing a textile product or a leather product allows for the temporary fixing while avoiding a portion to be sewed and for preventing the adhesive from adhering to a needle.

As described above, the yarn-like adhesive body can be well stuck while preventing a protrusion, a wrinkle, and overlapping even when shapes of both articles are a complicated shape such as a curved line, a curved surface, and unevenness. Further, the yarn-like adhesive body can be stuck in one step, and workability is good.

Even for a member that is easily deformed, such as fabric, cloth, and leather, which forms a textile product or a leather product, the temporary fixing using the yarn-like adhesive body can inhibit or prevent the member from deformation due to tension, and a design after fixing (final fixing) is improved.

Further, after two articles are fixed (finally fixed) using the yarn-like adhesive body, the yarn-like adhesive body can be easily pulled out and removed if necessary from the portion between both articles that are fixed (finally fixed). This allows for preventing the adhesive from squeezing out, and for well preventing deterioration of a design derived from aging discoloration of the remaining adhesive.

The yarn-like adhesive body allows for attempting combination of functions by twisting and combining the adhesive body with a yarn made of another material, or knitting the adhesive body with a yarn or cloth (including a nonwoven fabric and a sheet) made of another material.

The present invention is not limited to the embodiments described above, and may be appropriately modified, improved, and the like. Any materials, shapes, sizes, numerical values, forms, numbers, arrangement positions, and the like of components in the embodiments described above are set as desired and are not limited as long as the present invention can be achieved.

Although the embodiments are described above with reference to the drawings, it is needless to say that the present invention is not limited to such examples. It will be apparent to those skilled in the art that various changes and modifications may be conceived within the scope of the claims. It is also understood that the various changes and modifications belong to the technical scope of the present invention. Each element in the embodiments described above may be combined freely within a range not departing from the spirit of the present invention.

INDUSTRIAL APPLICABILITY

The adhesive body delivery device of the present invention allows for freely delivering an adhesive body and sticking the adhesive body to a target object. The adhesive body can be smoothly delivered along various kinds of curved lines, and thus the adhesive body is applicable to a bonding work in various fields.

REFERENCE SIGNS LIST 1 main body
2 adhesive body
4 end portion
5 winding body
6 guide member
7 roller (press-bonding portion)
8 cap
11 turning portion
13 support portion
15 rotation shaft
62 guide ring
100 adhesive body delivery device

The invention claimed is:
1. An adhesive body delivery device comprising:
a main body having an internal space defined by one or more interior sidewalls of the main body;
a support mounted to the main body to be relatively turnable around a first turning axis, the support having a guide in an interior of the support, the guide being aligned with the internal space of the main body; and a press-bonding applicator mounted to the support at a mounting position and turnable in conjunction with the support, the press-bonding applicator being configured to deliver an adhesive body at a delivery position and being configured to stick the adhesive body to a target object while press-bonding the adhesive body, wherein a predetermined distance is ensured between the first turning axis of the support and the mounting position, wherein the press-bonding applicator is configured to turn around a second turning axis passing through the mounting position and being parallel to the first turning axis, wherein the adhesive body passes through the internal space of the main body to the guide, and wherein the adhesive body is supplied to the press-bonding applicator by way of the guide.

2. The adhesive body delivery device according to claim 1, wherein the press-bonding applicator is a roller that is rotatable independently of the support around a rotation axis coinciding with the mounting position, wherein the adhesive body passes through an outer periphery of the roller and is delivered along with a rotation of the roller, and wherein the predetermined distance is ensured between the rotation axis and the first turning axis.

3. The adhesive body delivery device according to claim 1, wherein the adhesive body includes an adhesive layer and a separator covering at least a part of the adhesive layer, and wherein at the press-bonding applicator, the separator is debonded from the adhesive layer and the adhesive body is stuck to the target object.

4. The adhesive body delivery device according to claim 1, wherein the adhesive body is a yarn-like adhesive body.

5. The adhesive body delivery device according to claim 1, wherein the adhesive body is a pressure-sensitive adhesive body.

6. An adhesive body delivery method comprising, sticking an adhesive body to a target object using an adhesive body delivery device, wherein the adhesive body delivery device includes, a main body;

a support mounted to the main body to be relatively turnable around a first turning axis; and a press-bonding applicator mounted to the support at a mounting position and turnable in conjunction with the support, the press-bonding applicator being configured to deliver an adhesive body at a delivery position and being configured to stick the adhesive body to a target object while press-bonding the adhesive body, wherein a predetermined distance is ensured between the first turning axis of the support and the mounting position, wherein the press-bonding applicator is configured to turn around a second turning axis passing through the mounting position and being parallel to the first turning axis, the support is provided with a guide, and the adhesive body is supplied to the press-bonding applicator by way of the guide.

7. An adhesive body delivery device comprising:

a main body;

a support mounted to the main body to be relatively turnable around a first turning axis; and a press-bonding applicator mounted to the support at a mounting position and turnable in conjunction with the support, the press-bonding applicator being configured to deliver an adhesive body at a delivery position and being configured to stick the adhesive body to a target object while press-bonding the adhesive body, wherein a predetermined distance is ensured between the first turning axis of the support and the mounting position, the press-bonding applicator is configured to turn around a second turning axis passing through the mounting position and being parallel to the first turning axis, the support is provided with a guide, and the adhesive body is supplied to the press-bonding applicator by way of the guide.

8. The adhesive body delivery device according to claim 7, wherein the adhesive body is supplied to the guide from a position outside the main body.

9. The adhesive body delivery device according to claim 7, wherein the press-bonding applicator is a roller that is rotatable independently of the support around a rotation axis coinciding with the mounting position, wherein the adhesive body passes through an outer periphery of the roller and is delivered along with a rotation of the roller, and wherein the predetermined distance is ensured between the rotation axis and the first turning axis.

10. The adhesive body delivery device according to claim 7, wherein the adhesive body includes an adhesive layer and a separator covering at least a part of the adhesive layer, and wherein at the press-bonding applicator, the separator is debonded from the adhesive layer and the adhesive body is stuck to the target object.

11. The adhesive body delivery device according to claim 7, wherein the adhesive body is a yarn-like adhesive body.

12. The adhesive body delivery device according to claim 7, wherein the adhesive body is a pressure-sensitive adhesive body.

* * * * *